United States Patent

Beard et al.

[15] 3,697,675

[45] Oct. 10, 1972

[54] STEREOSCOPIC TELEVISION SYSTEM

[72] Inventors: Terry D. Beard, 619 Hampshire Road, Westlake Village, Calif. 91361; Eric R. Garen, 1636 3/4 Franklin Avenue, Santa Monica, Calif. 90404

[22] Filed: Dec. 23, 1970

[21] Appl. No.: 100,930

[52] U.S. Cl.......................................178/6.5, 178/5.4

[51] Int. Cl................................................H04n 9/54

[58] Field of Search........178/6.5, 5.4, 5.4 W, 5.4 TC

[56] References Cited

UNITED STATES PATENTS

| | | | |
|---|---|---|---|
| 2,898,397 | 8/1959 | Richman | 178/5.2 |
| 3,294,898 | 12/1966 | Gold | 178/5.4 W |
| 3,290,434 | 12/1966 | Cooper | 178/5.4 W |
| 3,165,578 | 1/1965 | Lauricella | 178/6.5 |

FOREIGN PATENTS OR APPLICATIONS

| | | | |
|---|---|---|---|
| 831,630 | 3/1960 | Great Britain | 178/6.5 |
| 899,969 | 6/1962 | Great Britain | 178/6.5 |

OTHER PUBLICATIONS

Maxwell, Cameras That Wink Can Produce 3-D TV, Electronics, Mar. 18, 1968, pp. 132- 133.

*Primary Examiner*—Robert L. Griffin
*Assistant Examiner*—Joseph A. Orsino, Jr.
*Attorney*—Allan M. Shapiro

[57] ABSTRACT

A method and apparatus for broadcasting stereoscopic images via a conventional color television system. A pair of monochrome TV cameras are situated to view the same scene from two separated positions. Stereoplex interface circuitry disclosed herein converts outputs from these cameras to luminance and chrominance signals which are supplied to a color television transmitter. A composite color signal is broadcast which produces on a color TV receiver two spaced images, each of a different color. When viewed through glasses having image-colored lenses, a three-dimensional scene is perceived. On a black and white receiver, only a single image is produced.

14 Claims, 3 Drawing Figures

PATENTED OCT 10 1972

3,697,675

INVENTORS
TERRY D. BEARD
ERIC R. GAREN
BY Allan M. Shapiro
ATTORNEY

STEREOSCOPIC TELEVISION SYSTEM

BACKGROUND OF THE INVENTION

1. Field of the Invention

The present invention relates to the broadcasting of stereoscopic images via a conventional color television system. The invention also relates to apparatus for converting a pair of monochrome camera outputs to luminance and chrominance signals which produce on a color TV receiver stereoscopically spaced images each of a different color.

2. Description of the Prior Art

In stereoscopic motion pictures, three-dimensional realism is achieved by simultaneously projecting two spaced images on a screen. Special glasses are worn so that each eye perceives only the corresponding left or right image. Typically, the images are projected using polarized light; the viewing glasses have one horizontally polarized lens to pass one image and one vertically polarized lens to pass the other image. As a result, the viewer senses a three-dimensional picture. Alternatively, each of the two images may be projected in a different color, and the screen viewed using glasses having like colored right and left lenses.

In the past, it has not been possible to adapt such techniques for stereoscopic television broadcasting using conventional television equipment. With black and white receivers, spaced images of separate colors are not possible, nor can selective polarization be facilitated. While a pair of receivers, perhaps each tuned to a separate channel, could be used to provide spaced images, such a system is impractical for home use where only a single receiver is available.

Color television broadcasting suggests the possibility of producing on a color receiver a pair of spaced images each of different color, e.g., one red and the other green. When viewed through a pair of glasses having one red lens and one green lens, a stereoscopic effect is achieved.

Broadcasting of such stereoscopic images using conventional television equipment has not been implemented in the past. To illustrate the complications usually encountered, suppose that a dual lens system, each having a differently colored filter, were employed with a single color television camera to obtain stereoscopic images. This approach may produce acceptable spaced images on a color television receiver, but when viewed on a black and white receiver, only a blurred composite image is seen. Accordingly, such a system could not be used for commercial television broadcasting.

The present invention overcomes the limitations of the prior art by providing a stereoscopic television system utilizing conventional color TV transmitting equipment. The system produces on a color receiver spaced images of different colors which when viewed through appropriate glasses disclose a three-dimensional scene. When received on a monochromatic receiver, only one image is apparent, thus making the system black and white compatible.

SUMMARY OF THE INVENTION

In accordance with the present invention, there is provided a method and apparatus for stereoscopic television broadcasting. The system employs a pair of monochrome TV cameras situated to view the same scene from two separated positions. Stereoplex interface circuitry converts the outputs from these cameras to luminance and chrominance signals which are supplied to a conventional color TV transmitter. A composite color signal is broadcast which produces on a TV receiver two spaced images, each of a different color. When viewed through glasses having appropriately colored lenses, a three-dimensional scene is perceived. Only a single image is produced on a monochrome receiver.

In a preferred embodiment, the stereoplex interface circuitry comprises a first weighted adder and bandpass amplifier which provide as an output a Y luminance signal containing scene information from only one monochrome camera. The stereoplexer also incorporates second and third weighted adders and associated bandpass amplifiers for producing I and Q chrominance signals. These I and Q signals comprise combined outputs from both monochrome cameras, weighted appropriately to produce on a conventional color receiver differently colored stereoscopic images of equal effective brightness. The Y, I and Q signals from the stereoplexer are supplied to a conventional color TV transmitter in place of the corresponding signals from a conventional polychrome camera.

The images displayed on a color TV receiver are viewed through glasses having monochromatic filter lenses. For example, if the left and right stereoscopic images respectively are green and red, a pair of glasses having a green left lens and a red right lens may be used. A three-dimensional scene is perceived through such glasses.

Since the Y luminance signal is related to the output of only one monochrome camera, a black and white receiver will show only the scene viewed by that camera.

Thus an object of the present invention is to provide a method and apparatus for stereoscopic broadcasting via a conventional color television system.

Another object of the present invention is to provide a stereoscopic television system wherein the outputs of a spaced pair of monochrome cameras are combined by appropriate circuitry to provide luminance and chrominance signals to a conventional color TV transmitter, the composite signal broadcast thereby producing on a color TV receiver spaced stereoscopic images each of a separate color.

A further object of the present invention is to provide stereoplex interface circuitry for combining the outputs of a pair of monochrome cameras to produce luminance and chrominance signals acceptable by a color TV transmitter and producing differently colored images corresponding respectively to the scenes viewed by each camera.

BRIEF DESCRIPTION OF THE DRAWINGS

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein.

DESCRIPTION OF THE PREFERRED EMBODIMENT

Figure 1:
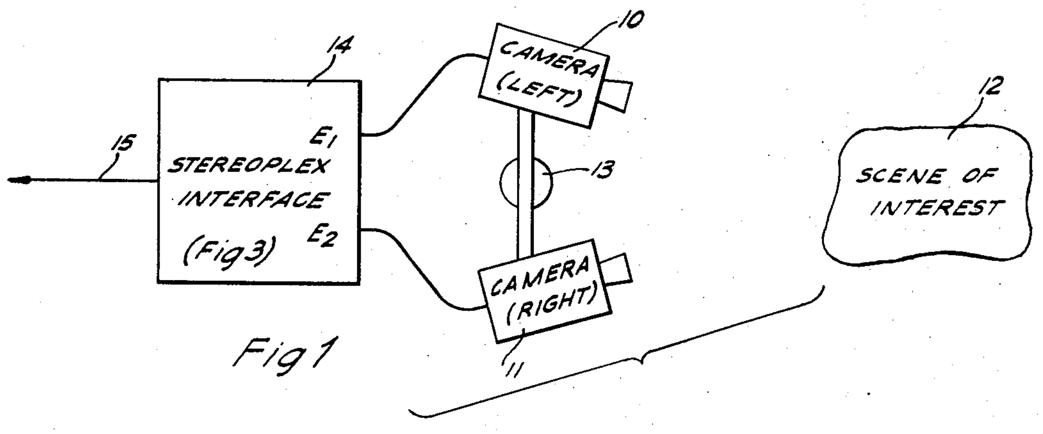
FIG. 1 is a simplified diagrammatic view of the transmission portion of the inventive stereoscopic television system.

Referring now to the drawings, and particularly to FIG. 1 thereof, there is shown the transmitting portion of a stereoscopic television system in accordance with the present invention. A pair of conventional monochrome TV cameras 10, 11 are situated to view the same scene 12 from two separated positions. The relative spacing and orientation of the cameras 10 and 11 may be maintained by an appropriate mounting 13 or may be variable to allow dramatic changes of the three-dimensional aspects of the transmitted image.

The signals from cameras 10 and 11, herein designated $E_1$ and $E_2$ respectively, are combined by appropriate stereoplex interface circuitry (stereoplexer) 14 to produce on a cable 15 an output analagous to that from a standard color television camera. This output, which includes both luminance and chrominance components, is provided to a conventional color television transmitter (not shown).

Figure 2:
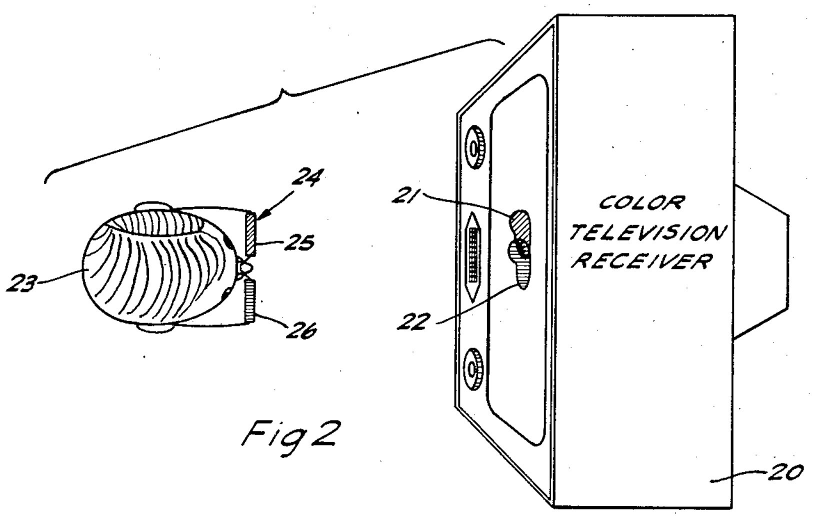
FIG. 2 is a pictorial representation of a viewer watching a stereoscopic television broadcast using the inventive system.

The monochrome camera signals $E_1$ and $E_2$ are so combined by stereoplexer 14 as to produce on a conventional color TV receiver 20 (FIG. 2) a pair of spaced stereoscopic images 21 and 22 each of a different color. Image 21 corresponds to scene 12 as viewed from left hand camera 10, while image 22 corresponds to scene 12 as viewed from right hand camera 11.

To perceive a stereoscopic scene, a viewer 23 employs viewing glasses 24 having monochromatic filter lenses 25 and 26. Preferably, the color of left lens 25 corresponds to that of image 21, while the color of right lens 26 is the same as that of image 22. For example, image 21 and lens 25 each may be green, while image 22 and lens 26 may be red. Green lens 25 then will transmit image 21 but prevent the viewer's left eye from seeing red image 22. Likewise, red lens 26 will pass image 22 but not green image 21. If the perceived images are of approximately equal brightness, they will be merged by viewer 23 into a single three-dimensional scene.

Figure 3:
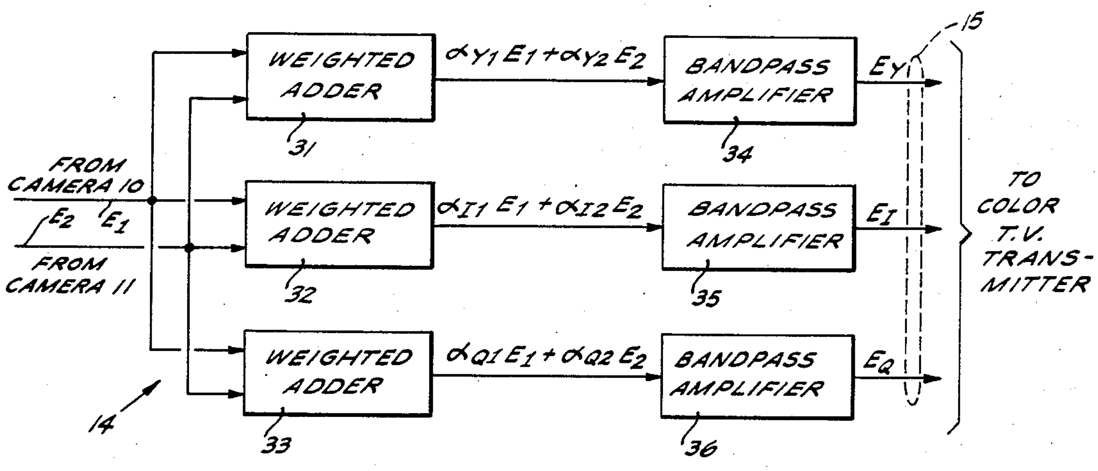
FIG. 3 is an electrical block diagram of the stereoplex interface portion of the system shown in FIG. 1.

An illustrative embodiment of stereoplexer 14 is shown in FIG. 3. Stereoplexer 14 accepts as inputs two black and white television signals $E_1$ and $E_2$, such as those produced by monochrome cameras 10 and 11, and encodes those two signals in a specific way onto the Y luminance and I and Q chrominance signals used in standard color television broadcasting.

The purpose of the encoding process is to produce a standard color television-like signal which will be accepted by a conventional color TV receiver 20 and displayed in such a way that one camera signal ($E_1$) results in an image 21 of one color (red, green or blue) and the other signal ($E_2$) results in a superposed, stereoscopic image 22 of another color.

The stereoplexer encoding may be described by the six coefficients $\alpha_{Y1}, \alpha_{Y2}, \alpha_{I1}, \alpha_{I2}, \alpha_{Q1}, \alpha_{Q2}$ which relate the luminance signal $E_Y$ and the I and Q chrominance signal $E_I$ and $E_Q$ to the inputs $E_1$ and $E_2$ as follows:

$$E_Y = \alpha_{Y1}E_1 + \alpha_{Y2}E_2 \quad (1)$$

$$E_I = \alpha_{I1}E_1 + \alpha_{I2}E_2 \quad (2)$$

$$E_Q = \alpha_{Q1}E_1 + \alpha_{Q2}E_2 \quad (3)$$

It is these standard Y, I and Q signals which are broadcast by conventional color TV transmitting equipment.

Electronically, the Y, I, and Q signals are composed by using three weighted adders 31, 32, 33 shown in FIG. 3. The signals from respective weighted adders 31, 32, 33 are passed through bandpass amplifiers 34, 35, 36 which limit the frequencies passed. Because the I, Q, and Y signals are broadcast with different bandwidths, it may be necessary to prelimit the passband of the Y and I signals by passing them through these bandpass amplifiers to prevent white fringing of the images. It is important that this fringing effect not occur because one eye must see only image 21 and the other eye see only image 22. Any white fringing of the otherwise monochromatic images will be passed by the conjugate one of filters 25 and 26, thereby causing "crosstalk" between the two images.

The $\alpha$ coefficients must be determined mathematically so that (1) there is no interference or crosstalk between images 21, 22, i.e., the signal from each camera 10, 11 will produce an image of one and only one color at receiver 20; (2) the two images are of equal brightness when observed through specified monochromatic filters; and (3) the output of only one of monochrome cameras 10, 11 will be displayed on a black and white television set receiving the composite color signal.

To produce images of equal brightness, several factors must be considered. First, the brightness of the displayed images must be considered. The relative brightness of the superposed red, green, and blue images composing a black and white image on a color television receiver are in the ratio of 3: 6: 1. Since we desire that viewer 23 receive differently colored but "equally bright" images through each eye, their values relative to their black and white composition values must be adjusted. For example, if red and green were chosen for the two display colors, the red to green brightness ratio should be increased by a 2:1 factor.

Second, the relative transmissions of color filters 25, 26 worn by viewer 23 must be considered in adjusting the brightness of images 21, 22. Again, the effect to be attained is that each eye be presented with equally bright images. Taking these two factors into account, it is a straight-forward calculation to determine the relative signal strengths needed to achieve equally bright images.

Having achieved equal brightness in the images, the next important consideration in determining the values of the $\alpha$ parameters is the elimination of crosstalk between the images. For instance, if one camera signal is to be displayed as a green image and the other camera signal as a red image, it is important that the first signal result in an image with no red in it and the second signal result in an image with no green in it.

This is achieved by solving the equations below. The first set of equations (4), (5) and (6) relates the red, green, and blue signals $E_R$, $E_G$ and $E_B$ applied to the color television receiver picture tube in terms of the luminance and chrominance signals $E_Y$, $E_I$ and $E_Q$.

$$E_R = 0.96\,E_I + 0.63\,E_Q + 1.00\,E_Y \quad (4)$$

$$E_B = -1.11\,E_I + 1.72\,E_Q + 1.00\,E_Y \quad (5)$$

$$E_G = 0.28\,E_I - 0.64\,E_Q + 1.00\,E_Y \quad (6)$$

The $\alpha$ values are obtained by substituting Eqs. (1), (2) and (3) into Eqs. (4), (5) and (6). Additional constraints are obtained (a) by requiring image independence (for example, by setting the effect of $E_2$ on $E_R = 0$ and $E_1$ on $E_G = 0$); (b) by adjusting the magnitude of the effects of $E_2$ on $E_G$ and $E_1$ on $E_R$ with regard to the image brightness normalization described above, and (c) by requiring that only one of the stereo pair signals (i.e., only one of $E_1$ or $E_2$) affect the luminance channel ($E_Y$). With these three constraints, the above Eqs. (1) through (6) may be solved simultaneously to determine the $\alpha$ values.

One set of coefficients which satisfies all three of these constraints is given below.

$$\alpha_{Y1} = 0.00 \qquad \alpha_{I2} = -1.04$$
$$\alpha_{Y2} = 1.00 \qquad \alpha_{Q1} = 0.50$$
$$\alpha_{I1} = 1.15 \qquad \alpha_{Q2} = 0.00$$

With these encoding coefficients, color television receiver 20 displays two images 21, 22, one red and one green. These particular coefficients yield red and green images of essentially equal brightness when viewed through No. 26 (red) and No. 57 (green) Wratten filters. On a black and white receiver, only one of the images is received, namely the same image which is displayed as the green image on a color receiver.

Note that although these particular coefficients encode the two inputs $E_1$ and $E_2$ into Y, I and Q signals which produce red and green color images, the $\alpha$ coefficients may alternatively be chosen to encode the inputs to produce red and blue, or green and blue image pairs.

The $\alpha$ values listed above represent one possible solution that has two advantages. First, the resolution of the black and white image will not be appreciably degraded because the luminance signal is derived solely from input $E_2$ and because $\alpha_{Q2} = 0$. The signal may thus be transmitted without bandlimiting to Q channel bandwidth (which is narrower than the bandwidths of the I chrominance and Y luminance channels). Second, the $\alpha_{Q1}$ coefficient is small, which again allows wider bandwidth transmission of the image related to camera 10, thus creating images of maximum possible sharpness.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

Thus, for further example, means other than the two cameras 10 and 11 may be used for generating the two signal inputs $E_1$ and $E_2$. In the cases of cartoons and cartoon-like characters and representations, as particular examples, a computer or similar means may be utilized instead of video cameras to generate signals $E_1$ and $E_2$ corresponding or analogous to such signals as would be generated by the cameras viewing the same scene.

We claim:

1. A system for broadcasting stereoscopic images via a conventional color television, comprising:
   first and second television cameras situated to view the same scene from two separated positions, and
   stereoplexer means for combining the outputs from said cameras into luminance and I and Q chrominance signals for input to a conventional color television transmitter, the resultant complex color signal broadcast by said transmitter producing on a monochrome television receiver an image corresponding to the scene as viewed by only one of said cameras, and producing on a conventional color TV receiver a first image of only a first kinescope primary color and a second image of only a different, second primary color, said images corresponding respectively to the scene as viewed by said first and second cameras.

2. A stereoscopic television system as defined in claim 1 further comprising:
   a pair of viewer glasses having first and second monochrome filter lenses corresponding respectively to said first and second colors, a viewer wearing said glasses to watch said images perceiving a stereoscopic scene.

3. A stereoscopic television system as defined in claim 2 wherein said I and Q chrominance signals each comprise sums of the outputs of said cameras weighted to compensate for the relative composition values said first and second colors in a black and white television image, whereby said first and second images are of effectively equal brightness.

4. A stereoscopic television system as defined in claim 3 wherein said sums further are weighted to compensate for differences in transmissivity of said monochrome filters, thereby producing first and second images of equal perceived brightness when viewed through said glasses.

5. A stereoscopic television system as defined in claim 1 wherein said stereoplexer means comprises a first weighted adder and a first bandpass amplifier accepting said monochrome camera outputs and providing said luminance signal, and second and third weighted adders each accepting said camera outputs and providing via respective second and third bandpass amplifiers said I and Q chrominance signals.

6. A stereoscopic television system as defined in claim 5 wherein said luminance and chrominance signals are provided to a conventional color television transmitter in place of the outputs of a conventional color camera.

7. A stereoscopic television system as defined in claim 1 wherein said luminance signal comprises only the weighted output from one of said cameras.

8. A system for color television broadcasting of stereoscopic images comprising:
   first and second television signal sources representing the same scene as viewed from two separated positions, stereoplex interface circuitry accepting outputs $E_1$ and $E_2$ respectively from said sources and producing in response thereto a luminance signal $E_Y$ and chrominance signals $E_I$ and $E_Q$ for modulating a conventional color television transmitter, said luminance signal comprising the weighted output of only one of said sources, said chrominance signals comprising sums of said outputs weighted to produce on a conventional color receiver a first image of only one kinescope primary color and a second image of only another kinescope primary color, said images corresponding respectively to the scene as viewed by said first and second sources.

9. A stereoscopic television system as defined in claim 8 wherein said first image is red and said second image is green.

10. A stereoscopic television system as defined in claim 9 wherein said $E_Y$, $E_I$ and $E_Q$ signals are given by the following equations:

$$E_Y = E_2$$

$$E_I = 1.15E_1 - 1.04E_2$$

$$E_Q = 0.5E_1$$

11. A method for broadcasting stereoscopic images via a conventional color television system, comprising:

generating a pair of video signals corresponding to a scene viewed from two separated positions;

utilizing only one of said video signals to provide a luminance signal, and combining said pair of signals to provide chrominance signals for modulating a conventional television transmitter to broadcast a composite color signal producing on a monochrome television receiver an image corresponding to the scene as viewed from one position and producing at a conventional color television receiver a first image of only one kinescope primary color and a second image of only another kinescope primary color, said images corresponding respectively to said pair of signals.

12. The method for broadcasting stereoscopic images defined in claim 11 further comprising:

viewing said color television receiver through a pair of glasses having first and second monochrome filter lenses corresponding respectively to the colors of said first and second images, a viewer thereby perceiving a stereoscopic scene.

13. A stereoscopic television system comprising:

first and second television sources providing independent signals $E_1$ and $E_2$ respectively representing a scene as viewed from two separated positions, and stereoplexer circuitry for combining said signals $E_1$ and $E_2$ to provide a luminance signal $E_Y$ and chrominance signals $E_I$ and $E_Q$ for utilization in a conventional color TV system, said luminance signal $E_Y$ comprising only the signal $E_1$ or the signal $E_2$ but not both, said signals $E_I$ and $E_Q$ comprising combinations of the signals $E_1$ and $E_2$ weighted so that when applied to a conventional color TV receiver, the signal $E_1$ will have negligible effect on one of the kinescope color signals $E_R$, $E_G$ and $E_B$, and the signal $E_2$ will have negligible effect on another of the color signals.

14. A stereoscopic television system according to claim 13 together with means for adjusting the magnitude of the effect of the signals $E_1$ and $E_2$ on the respective one and other color signals to equalize the brightness of the images produced thereby.

* * * * *